United States Patent [19]
Mitsuda et al.

[11] Patent Number: 5,914,808
[45] Date of Patent: Jun. 22, 1999

[54] INTERMEDIATE ISOLATOR TYPE FIBER AMPLIFIER AND FIBER TRANSMISSION SYSTEM

[75] Inventors: Masahiro Mitsuda, Kyoto; Jun Ohya, Osaka; Tomoaki Uno, Kobe, all of Japan

[73] Assignee: Matsushita Electric Industrial Co., Ltd., Osaka, Japan

[21] Appl. No.: 08/701,987

[22] Filed: Aug. 23, 1996

[30] Foreign Application Priority Data

Aug. 24, 1995 [JP] Japan ................................. 7-215831
Jul. 30, 1996 [JP] Japan ................................. 8-200670

[51] Int. Cl.$^6$ ................................................ H01S 3/00
[52] U.S. Cl. ................................ 359/341; 359/160
[58] Field of Search ................................ 359/341, 337, 359/160

[56] References Cited

U.S. PATENT DOCUMENTS

| | | | |
|---|---|---|---|
| 5,050,949 | 9/1991 | DiGiovanni et al. | 359/341 |
| 5,280,383 | 1/1994 | Federici et al. | 359/341 |
| 5,375,010 | 12/1994 | Zervas et al. | 359/341 |
| 5,430,572 | 7/1995 | DiGiovanni et al. | 359/341 |
| 5,497,265 | 3/1996 | Fontana et al. | 359/341 |
| 5,561,552 | 10/1996 | Shibuya | 359/341 |
| 5,566,018 | 10/1996 | Lee et al. | 359/341 |
| 5,579,153 | 11/1996 | Laming et al. | 359/341 |

OTHER PUBLICATIONS

W. -Y. Guo et al., "High-Speed Bidirectional Four-Channel Optical FDM-NCFSK Transmission Using an Er$^{3+}$-Doped Fiber Amplifier", *IEEE Photonics Technology Letters*, vol. 5, No. 2, pp. 232–235, 1993.

M. N. Zervas et al., "Efficient Erbium-Doped Fiber Amplifiers Incorporating an Optical Isolator", *IEEE Journal of Quantum Electronics*, vol. 31, No. 3, pp. 472–480, 1995.

O. Lumholt et al., "Optimum Position of Isolators within Erbium-Doped Fibers", *IEEE Photonics Technology Letters*, vol. 4, No. 6, pp. 568–570, 1992.

T. E. Darcie et al., "Fiber-Reflection-Induced Impairments in Lightwave AM-VSB CATV Systems", *Journal of Lightwave Technology*, vol. 9, No. 8, pp. 991–995, 1991.

*Primary Examiner*—Mark Hellner
*Attorney, Agent, or Firm*—Ratner & Prestia

[57] ABSTRACT

The fiber amplifier of this invention includes: a first rare earth element doped fiber; a second rare earth element doped fiber; and a pump light source for generating pump light for exciting the first rare earth element doped fiber and the second rare earth element doped fiber, the fiber amplifier receiving analog signal light and amplifying the analog signal light, wherein the fiber amplifier further includes a directional transmitter disposed between the first rare earth element doped fiber and the second rare earth element doped fiber, and a transmittance of the directional transmitter for at least light having the same wavelength as the signal light propagating from the first rare earth element doped fiber to the second rare earth element doped fiber is larger than a transmittance of the directional transmitter for the light propagating from the second rare earth element doped fiber to the first rare earth element doped fiber.

10 Claims, 11 Drawing Sheets

INTERMEDIATE ISOLATOR TYPE FIBER AMPLIFIER AND FIBER TRANSMISSION SYSTEM

BACKGROUND OF THE INVENTION

1. Field of the Invention

The present invention relates to a fiber amplifier which provides high output with low noise and low distortion and a fiber transmission system using such a fiber amplifier.

2. Description of the Related Art

An optical communication system includes a semiconductor laser as a signal source for generating a signal, a fiber as a route for transmitting the signal, and a light receiver for detecting the signal. The system also includes a fiber amplifier when it is required to compensate for a transmission loss and a distribution loss. The optical communication system has two signal transmission methods; the analog signal transmission and the digital signal transmission. In the analog signal transmission, the noise characteristic and the distortion characteristic are major items for evaluation, while in the digital signal transmission, the code error ratio characteristic is a major item for evaluation.

The noise figure (NF) of a fiber amplifier can be determined by measuring the deterioration in the carrier-to-noise ratio (CNR) of emergent light with respect to that of incident light. This deterioration is mainly due to multiple reflection of amplified spontaneous emission (ASE) and signal light. It is reported that ASE noise significantly increases when reflection points exist in the fiber amplifier (IEEE Photonics Technology Letters, Vol. 4, No. 6, pp. 568–570, 1992). Also reported is that, in general, multiple reflection noise increases when reflection points exist on a transmission route (Journal of Lightwave Technology, Vol. 9, No. 8, pp. 991–995, 1991).

The fiber amplifier includes an optical fiber doped with erbium ions, one type of rare earth element ions, and an optical coupler for coupling pump light to the erbium-doped fiber. Optical isolators for suppressing light reflection inside the fiber amplifier are disposed at the input end and the output end of the erbium-doped fiber.

The placement of the optical isolators at the input and output ends of the erbium-doped fiber amplifier causes insertion loss and consequently deteriorates the NF and reduces the amount of output light. Further, using two optical isolators increases the cost since an optical isolator is expensive.

A fiber amplifier where optical isolators are not disposed at both the input and output ends of a fiber amplifier is reported (IEEE Photonics Technology Letters, Vol. 5, No. 2, pp. 232–235, 1993). However, since the fiber amplifier of this report is for amplifying digital signals, no indication is found on the NF characteristic and the distortion characteristic. Therefore, the analog signal transmission characteristics are unknown.

A structure where only one optical isolator is disposed in the middle of a rare earth element doped fiber is reported (IEEE Journal of Quantum Electronics, Vol. 31, No. 3, pp. 472–480, 1995). This report studies only the ASE noise, but not the characteristics including signal light multiple reflection noise observed when reflection points exist in the optical fiber. No optimization of the noise characteristic is reported. No indication is found on the distortion characteristic. Therefore, the analog signal transmission characteristics are unknown.

As described above, in the conventional fiber amplifiers where optical isolators are not disposed at both input and output ends of an optical fiber, the analog signal transmission characteristics at the amplification of a high-input sub-carrier modulation (SCM) signal have not been studied.

An optical isolator connected to an optical fiber to prevent multiple reflection generates a loss of about 0.5 dB (10%). The NF deteriorates when such an optical isolator is connected to the input end of the doped fiber. The output light amount lowers when it is connected to the output end of the doped fiber.

SUMMARY OF THE INVENTION

The fiber amplifier of this invention includes: a first rare earth element doped fiber; a second rare earth element doped fiber; and a pump light source for generating pump light for exciting the first rare earth element doped fiber and the second rare earth element doped fiber, the fiber amplifier receiving analog signal light and amplifying the analog signal light, wherein the fiber amplifier further includes a directional transmitter disposed between the first rare earth element doped fiber and the second rare earth element doped fiber, and a transmittance of the directional transmitter for at least light having the same wavelength as the signal light propagating from the first rare earth element doped fiber to the second rare earth element doped fiber is larger than a transmittance of the directional transmitter for the light propagating from the second rare earth element doped fiber to the first rare earth element doped fiber.

According to another aspect of the invention, a fiber transmission system is provided. The system includes: a signal light source for generating analog signal light; a fiber amplifier for amplifying the analog signal light; a fiber transmission route for transmitting the signal light; and a light receiver for receiving the signal light, wherein the fiber amplifier includes a first rare earth element doped fiber, a second rare earth element doped fiber, and a pump light source for generating pump light for exciting the first rare earth element doped fiber and the second rare earth element doped fiber, the fiber amplifier receiving the analog signal light and amplifying the analog signal light, the fiber amplifier further includes a directional transmitter disposed between the first rare earth element doped fiber and the second rare earth element doped fiber, and a transmittance of the directional transmitter, for at least light having the same wavelength as the signal light propagating from the first rare earth element doped fiber to the second rare earth element doped fiber, is larger than a transmittance of the directional transmitter for the light propagating from the second rare earth element doped fiber to the first rare earth element doped fiber.

Thus, the invention described herein makes possible the advantages of (1) providing a fiber amplifier with low NF and high output characteristics where an optical isolator is neither disposed at the input end nor at the output end of a doped fiber, and (2) providing a fiber transmission system including such a fiber amplifier.

These and other advantages of the present invention will become apparent to those skilled in the art upon reading and understanding the following detailed description with reference to the accompanying figures.

DESCRIPTION OF THE PREFERRED EMBODIMENTS

Figure 1:
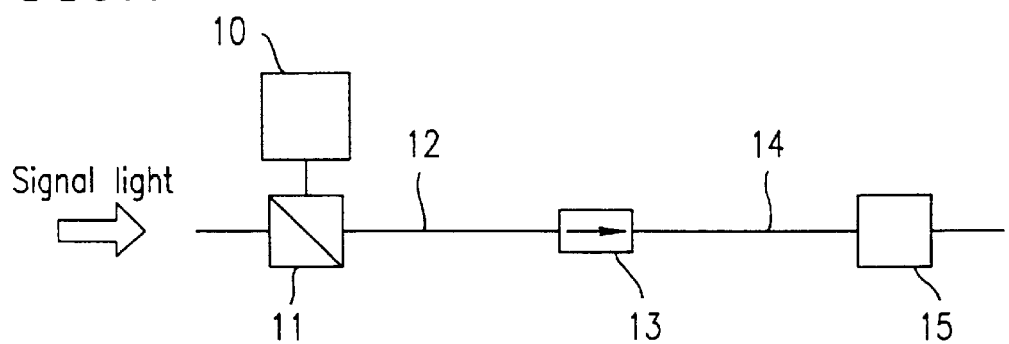
FIG. 1 shows a configuration of a fiber amplifier of Example 1 according to the present invention.

The present invention will be described by way of examples with reference to the accompanying drawings.
(EXAMPLE 1)

The fiber amplifier of Example 1 will be described with reference to FIGS. 1 to 9.

The fiber amplifier of this example includes a first erbium-doped fiber (EDF1) 12, a second erbium-doped fiber (EDF2) 14, and a semiconductor laser (pump light source) 10 for generating 1.48 $\mu$m band pump light for exciting the EDF1 12 and the EDF2 14. The fiber amplifier of this example receives and amplifies 1.56 $\mu$m band analog signal light.

An optical isolator 13 is disposed between the EDF1 12 and the EDF2 14 as a directional transmitter. Pump light emitted from the semiconductor laser 10 is coupled to the EDF1 12 by a coupler 11. A filter 15 is connected to the output end of the EDF2 14 for removing the pump light.

The optical isolator 13 is designed so that, for at least light having the same wavelength as the signal light, the transmittance thereof for the light propagating from the EDF1 12 to the EDF2 14 should be larger than that for the light propagating from the EDF2 14 to the EDF1 12. In this example, to satisfy the above condition, an optical isolator with an isolation of 40 dB and a reflectance at both ends thereof of −50 dB is used as the optical isolator 13. The isolation of the optical isolator is preferably about 20 dB or more for the wavelength of the signal light, but no isolation is required for pump light.

In this example, a filter-type coupler with an internal reflectance of −60 dB or less is used as the coupler 11. The total length of the EDF1 12 and the EDF2 14 is 53 m.

Signal light (wavelength: 1.560 $\mu$m) incident on the fiber amplifier shown in FIG. 1 is coupled with pump light emitted from the semiconductor laser 10 by the coupler 11. The signal light is then amplified by the EDF1 12 and EDF2 14, and the amplified signal light is output via the filter 15.

In this example, in the case of exciting the EDF1 12 and the EDF2 14 with 100 mW pump light, the output light amount of about 18 dBm was obtained when the input light amount of the signal light was 0 dM.

Figure 3:
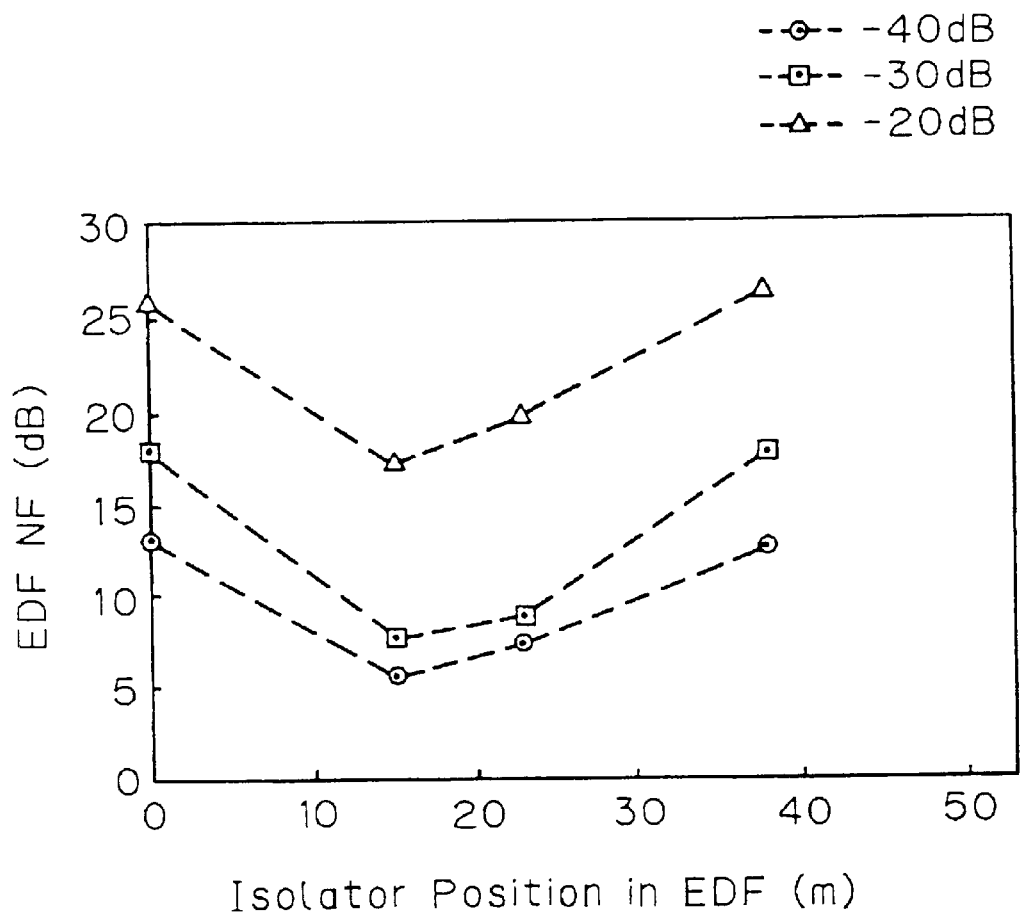
FIG. 3 is a graph showing the NF characteristic with respect to the position of an optical isolator between EDF1 and EDF2 in Example 1.

The NF of the fiber amplifier can be obtained by electrically measuring the CNRs of incident light and emergent light and determining the deterioration in the CNR. FIG. 3 shows the measurement results of the NF with respect to the position of the optical isolator. The reflectance at the input and output ends of the fiber amplifier was used as a variable. From FIG. 3, it is observed that the NF deterioration can be suppressed by disposing the optical isolator at a position away from the input end of the entire erbium-doped fiber toward the output end thereof by 20 to 30% of the entire erbium-doped fiber length. In other words, in order to suppress the NF deterioration, the length of the EDF1 12 is preferably 20 to 30% of the total length of the EDF1 12 and the EDF2 14.

Figure 2:
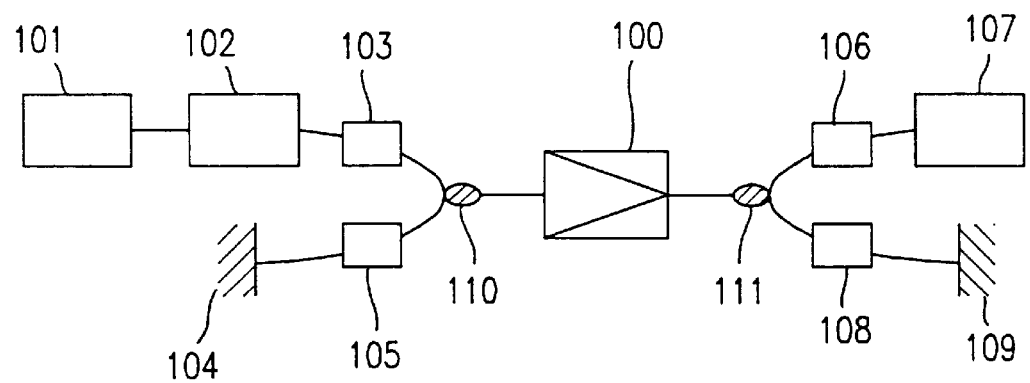
FIG. 2 shows a configuration of a measuring system.

The NF characteristic of the fiber amplifier shown in FIG. 1 with respect to the reflectance at the input and output ends thereof was measured using a measuring system shown in FIG. 2. A fiber amplifier 100 in FIG. 2 is identical to the fiber amplifier shown in FIG. 1. Referring to FIG. 2, signal light emitted from a signal light source 102 is coupled to the input end of the EDF1 12 of the fiber amplifier 100 via an optical attenuator 103 and a 3 dB coupler 110. The signal light source 102 is a distribution feedback type semiconductor laser diode (DFB-LD) which emits laser light with a wavelength of 1.560 $\mu$m. The signal light source 102 is driven with a modulated voltage from a signal generator 101 as a signal source. The 3 dB coupler 110 is coupled with a mirror 104 via an optical attenuator 105 in order to change the reflectance at the input end of the fiber amplifier 100. The output end of the EDF2 14 of the fiber amplifier 100 is coupled to a signal analyzer 107 via a 3 dB coupler 111 and an optical attenuator 106. The 3 dB coupler 111 is coupled with a mirror 109 via an optical attenuator 108 in order to change the reflectance at the output end of the fiber amplifier 100. The reflectance at the input and output ends can be changed by adjusting the light attenuation amounts at the optical attenuators 105 and 108.

The inventors of the present invention have analytically studied the optimum position of the optical isolator in the entire erbium-doped fiber to obtain the minimum NF. The analytical results of the study based on an analytical model of the fiber amplifier according to the present invention will be described with reference to FIG. 4.

Figure 4:
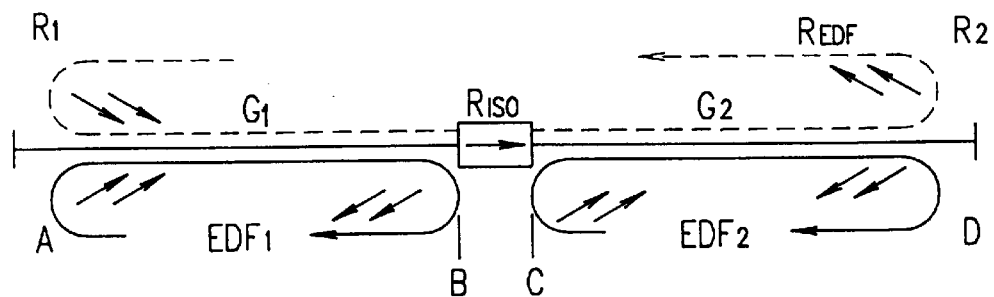
FIG. 4 shows an analytical model of the fiber amplifier of Example 1.

In FIG. 4, a signal incident point A and a signal emergent point D correspond to the input end of the EDF1 12 and the output end of the EDF2 14, respectively. The points A and D are reflection points. Points B and C at the input and output ends of the intermediate optical isolator are also reflection points. Assume that the reflectances at the incident and emergent points A and D are $R_1$ and $R_2$, respectively, that the reflectance at the points B and C is $R_{ISO}$, and that the effective reflectance due to backward Rayleigh scattering generated in the erbium-doped fiber is $R_{EDF}$. Multiple reflection is generated between the points A and B, the points C and D, and the points A and D. At this time, the NF at the modulation with a SCM signal is represented by expression (1) below:

$$NF = \frac{P_{ASE}}{4h\nu\Delta\nu} + \tag{1}$$

$$\frac{Pin}{4h\nu\pi} \cdot \{(4G_1^2(R_1 + R_{EDF})(R_{ISO} + R_{EDF}) +$$

$$4G_2^2(R_{ISO} + R_{EDF})(R_2 + R_{EDF}) +$$

$$4G_{12}(G_{12} \div L)(R_1 + R_{EDF})(R_2 + R_{EDF}))\} \cdot$$

$$\frac{1}{\sqrt{\pi}\,\sigma_f} \cdot \exp\left(-\frac{f^2}{4\sigma_f^2}\right)$$

$$\sigma_f = \beta \cdot (I_b - I_{th}) \cdot \frac{N\sqrt{m}}{2}$$

wherein the first term represents an ASE noise $N_{ASE}$ which can be measured by an optical measuring method, and the second term represents a noise due to signal light multiple reflection $NF_{ref}$. The term $G_{12}$ in expression (1) denotes a sum of $G_1$ and $G_2$, i.e., $G_{12}=G_1+G_2$. The noises $NF_{ASE}$ and $NF_{ref}$ are represented by equations (2) and (3) below, respectively:

$$NF_{ASE} = \frac{P_{ASE}}{4h\nu\Delta\nu} \tag{2}$$

$$NF_{REF} = \frac{Pin}{4h\nu\pi} \cdot \{(4G_1^2(R_1 + R_{EDF})(R_{ISO} + R_{EDF}) + \tag{3}$$

$$4G_2^2(R_{ISO} + R_{EDF})(R_2 + R_{EDF}) +$$

$$4G_{12}(G_{12} \div L)(R_1 + R_{EDF})(R_2 + R_{EDF}))\} \cdot$$

$$\frac{1}{\sqrt{\pi}\,\sigma_f} \cdot \exp\left(-\frac{f^2}{4\sigma_f^2}\right)$$

$$\sigma_f = \beta \cdot (I_b - I_{th}) \cdot \frac{N\sqrt{m}}{2}$$

Figure 5:
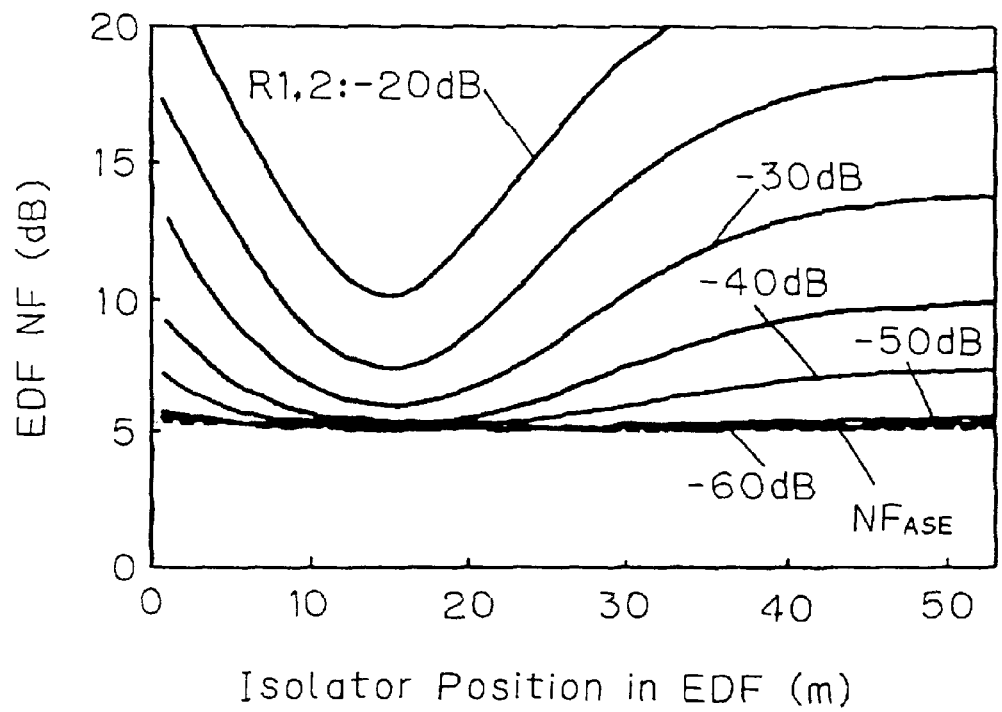
FIG. 5 is a graph showing the calculation results of the NF characteristic with respect to the position of the optical isolator in Example 1.

FIG. 5 is a graph showing the dependency of the NF upon the position of the optical isolator, obtained by the calculation of expression (1) above. The curves of FIG. 5 were obtained using the reflectance at the incident (emergent) point $R_1$ (=$R_2$) as a variable varying from −20 dB to −60 dB every −10 dB. The dashed line in FIG. 5 represents the ASE-caused noise component $NF_{ASE}$. The NF characteristic shown in FIG. 5 (calculated results) is in good conformity with the NF characteristic shown in FIG. 3 (experimental results). This proves that the multiple reflection model shown in FIG. 4 is appropriate.

Figure 6:
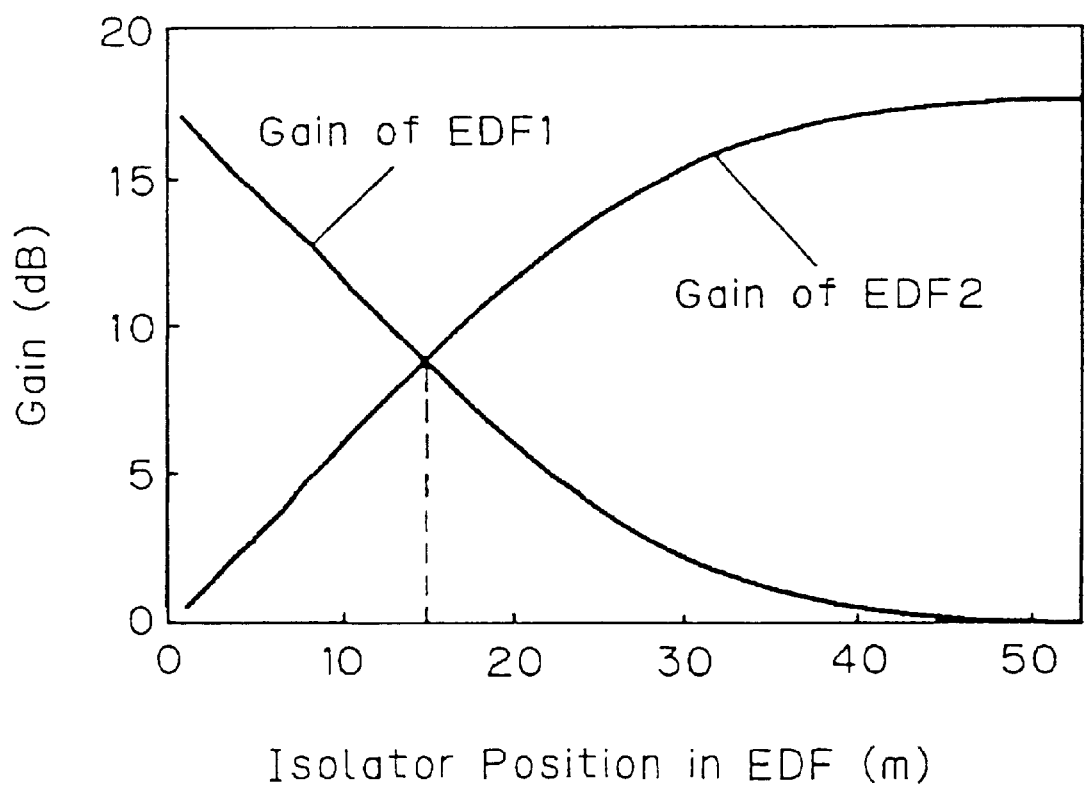
FIG. 6 is a graph showing the gains of the EDF1 and EDF2 with respect to the position of the optical isolator in Example 1.

FIG. 6 shows the dependency of the gains of the EDF1 and EDF2 upon the position of the optical isolator. The gain is 18 dB when the input light amount is 0 dBm. From FIG. 6, it is observed that the gains of the EDF1 and EDF2 are identical to each other when the optical isolator is disposed at a position away from the input end of the entire erbium-doped fiber toward the output end thereof by about 30% of the entire erbium-doped fiber length. This is due to the fact that the term of expression (3) representing the noise due to signal light multiple reflection is minimum when gains $G_1$ and $G_2$ are identical to each other.

Figure 7:
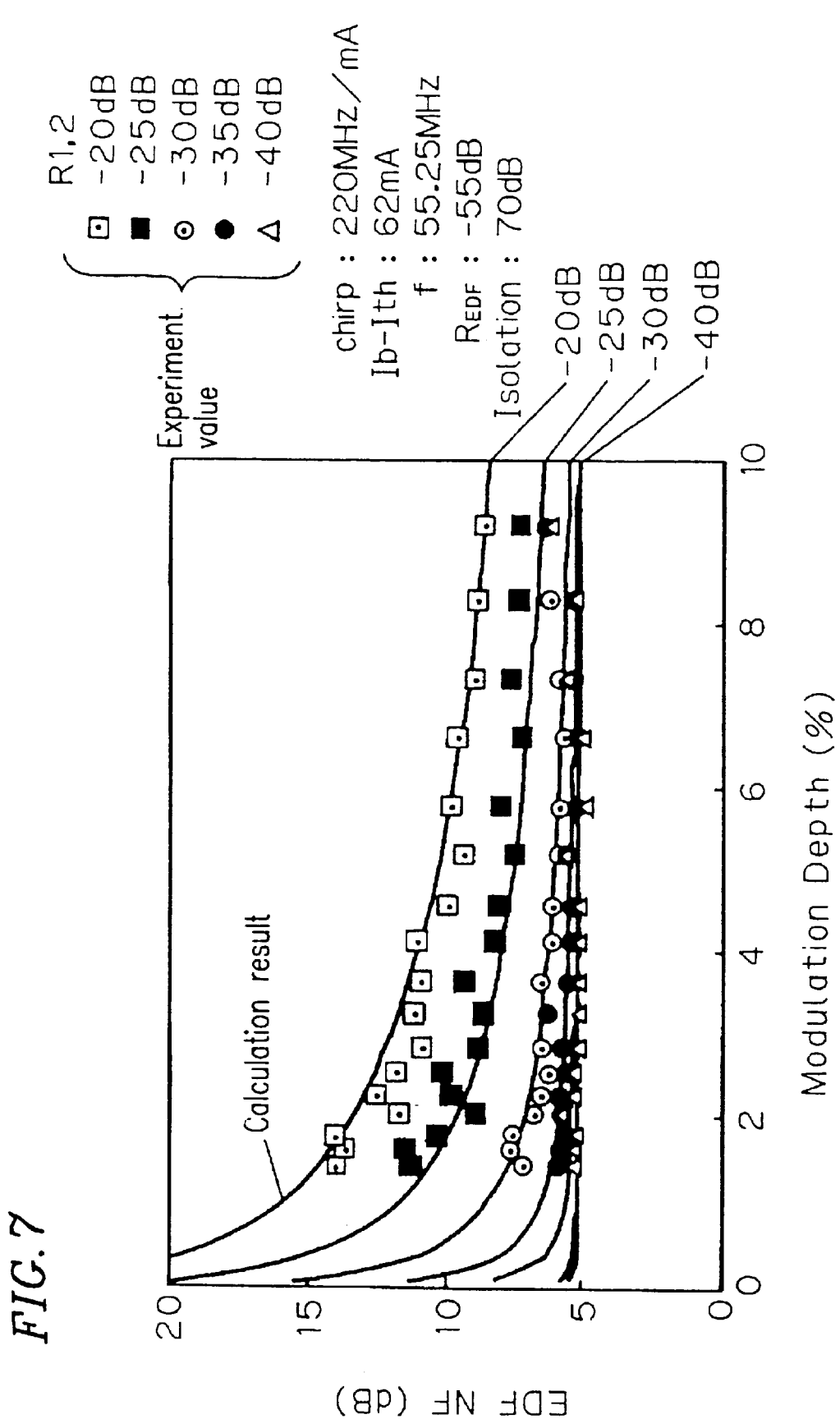
FIG. 7 is a graph showing the NF characteristic with respect to the modulation depth of signal light in Example 1.

FIG. 7 is a graph showing the dependency of the NF upon the modulation depth. In this measurement, the optical isolator is disposed at a position away from the input end of the EDF1 by 15 m (28%) where the NF is minimum. The Y-axis of the graph of FIG. 7 represents the NF and the X-axis thereof represents the modulation depth. The NF becomes lower as the modulation depth increases and thus the width of the oscillation frequency spectrum of the signal light laser increases. The measurement was conducted under the conditions of a chirp of the signal light source of 220 MHz/mA and a bias current exceeding the threshold current of 62 mA. Under these conditions, the NF is 6 dB or less when the reflectance at the input and output ends is −30 dB and the modulation depth is 5% or more. The solid-line curves in FIG. 7 represent the calculation results obtained from expression (1) above.

Figure 8:
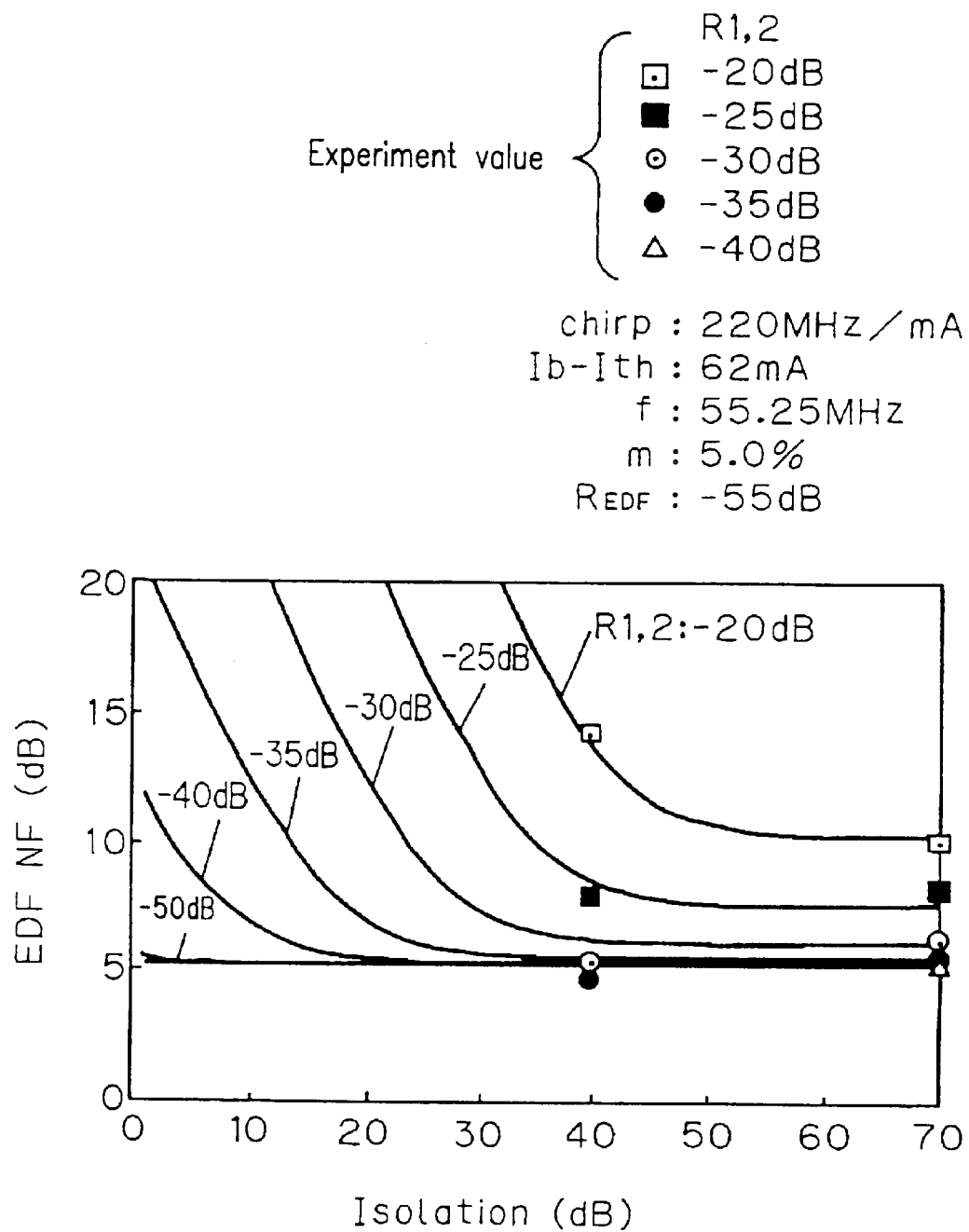
FIG. 8 is a graph showing the NF characteristic with respect to the isolation of the optical isolator in Example 1.

FIG. 8 shows the dependency of the NF characteristic upon the isolation of the optical isolator. The optical isolator was deposited at a position 15 m away from the input end of the EDF1, and the modulation depth was 5%. From FIG. 8, it is observed that, when the isolation is small, the NF deteriorates even if the reflectance at the input and output ends ($R_1$, $R_2$) is low. This is because, when the isolation is small, the multiple reflection between the points A and D shown in FIG. 3 increases to a level which may be obtained when no isolator is disposed in the line. From FIG. 8, it is observed that, in the case of an isolation of 40 dB, the NF can be 6 dB or less when the reflectance $R_1$, $R_2$ is −35 db or less.

From the above results, it is found that a low NF can be obtained by using a single optical isolator if the isolator is disposed in the middle of the entire erbium-doped fiber so that the total gain can be equally divided into two. It is also found that the NF becomes lower as the effective modulation depth is higher and the isolation of the optical isolator is higher. Thus, according to the present invention, a fiber amplifier with low NF can be realized at low cost by using only a single optical isolator.

Figure 9:
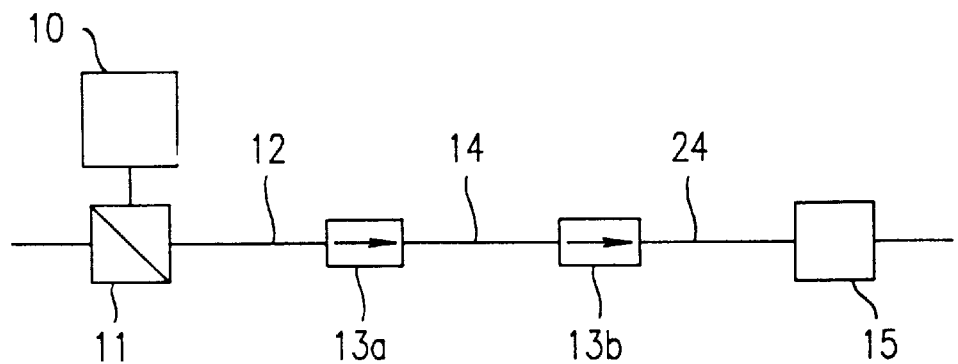
FIG. 9 shows a configuration of a modified fiber amplifier of Example 1 according to the present invention.

In this example, one optical isolator was disposed between two erbium-doped fibers (EDF1 and EDF2). Alternatively, as shown in FIG. 9, two optical isolators 13a and 13b may be disposed among three erbium-doped fibers 12, 14, and 24. In this modified example, it is also preferable to dispose the optical isolators so that the gains of the three erbium-doped fibers are substantially the same.

(EXAMPLE 2)

The fiber amplifier of Example 2 according to the present invention will be described with reference to FIGS. 10 to 14.

Figure 10:
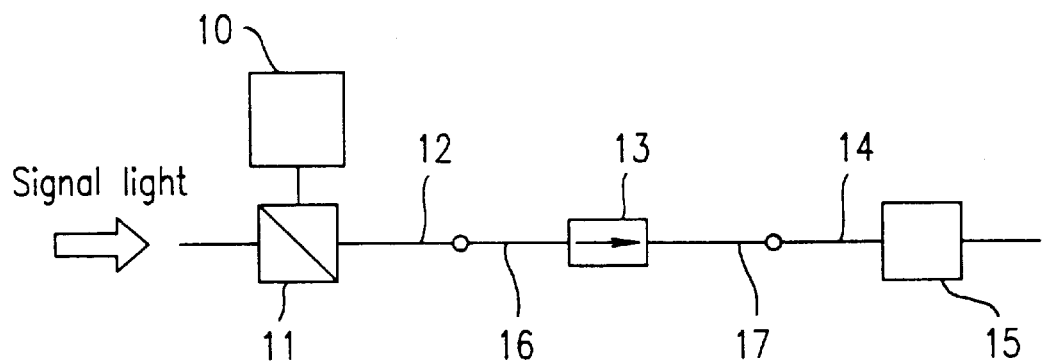
FIG. 10 shows a configuration of a fiber amplifier of Example 2 according to the present invention.

FIG. 10 shows a configuration of the fiber amplifier of this example. In FIG. 10, components corresponding to those of the fiber amplifier of Example 1 are denoted by the same reference numerals shown in FIG. 1.

The fiber amplifier of this example includes a first erbium-doped fiber (EDF1) 12, a second erbium-doped fiber (EDF2) 14, and a semiconductor laser (pump light source) 10 for generating 1.48 μm band pump light for exciting the EDF1 12 and the EDF2 14. The fiber amplifier of this example receives and amplifies 1.56 μm band analog signal light.

An optical isolator 13 is disposed between the EDF1 12 and the EDF2 14 as a directional transmitter. A single-mode fiber 16 is connected between the EDF1 12 and the optical isolator 13, and a single-mode fiber 17 is connected between the optical isolator 13 and the EDF2 14. Pump light emitted from the semiconductor laser 10 is coupled to the EDF1 12 by a coupler 11. A filter 15 is connected to the output end of the EDF2 14 for removing the pump light.

In this example, a filter-type coupler with an internal reflectance of −60 dB is used as the coupler 11. The total length of the EDF1 12 and the EDF2 14 is 53 m. The reflectance at both ends of the optical isolator 13 is −50 dB and the isolation thereof is 40 dB.

The secondary distortion characteristic with respect to the reflectance at the input and output ends of the fiber amplifier of this example was measured using the measuring system shown in FIG. 2.

Signal light with a wavelength of 1.560 μm incident on the fiber amplifier is coupled with pump light from the semiconductor laser 10 by the coupler 11. The signal light is then amplified by the EDF1 12 and EDF2 14, and the amplified signal light is output via the filter 15. In the case where the EDF1 12 and EDF2 14 were excited with 100 mW pump light, when the input light amount of the signal light with a wavelength of 1.560 μm was 0 dM, the output light amount of about 18 dBm was obtained. The secondary distortion level of the signal light laser is −60 dBc. If no reflection occurs at the ends of the erbium-doped fibers, no secondary distortion is generated in the fiber amplifier when the input light amount is −1 dBm.

The evaluation of the secondary distortion of the fiber amplifier was conducted in the following manner. The signal light laser (the DFB-LD 102 in FIG. 2) was modulated with a 2-tone SCM signal, and the intermodulation secondary (IM2) distortion of the light output from the fiber amplifier was measured.

Figure 11:
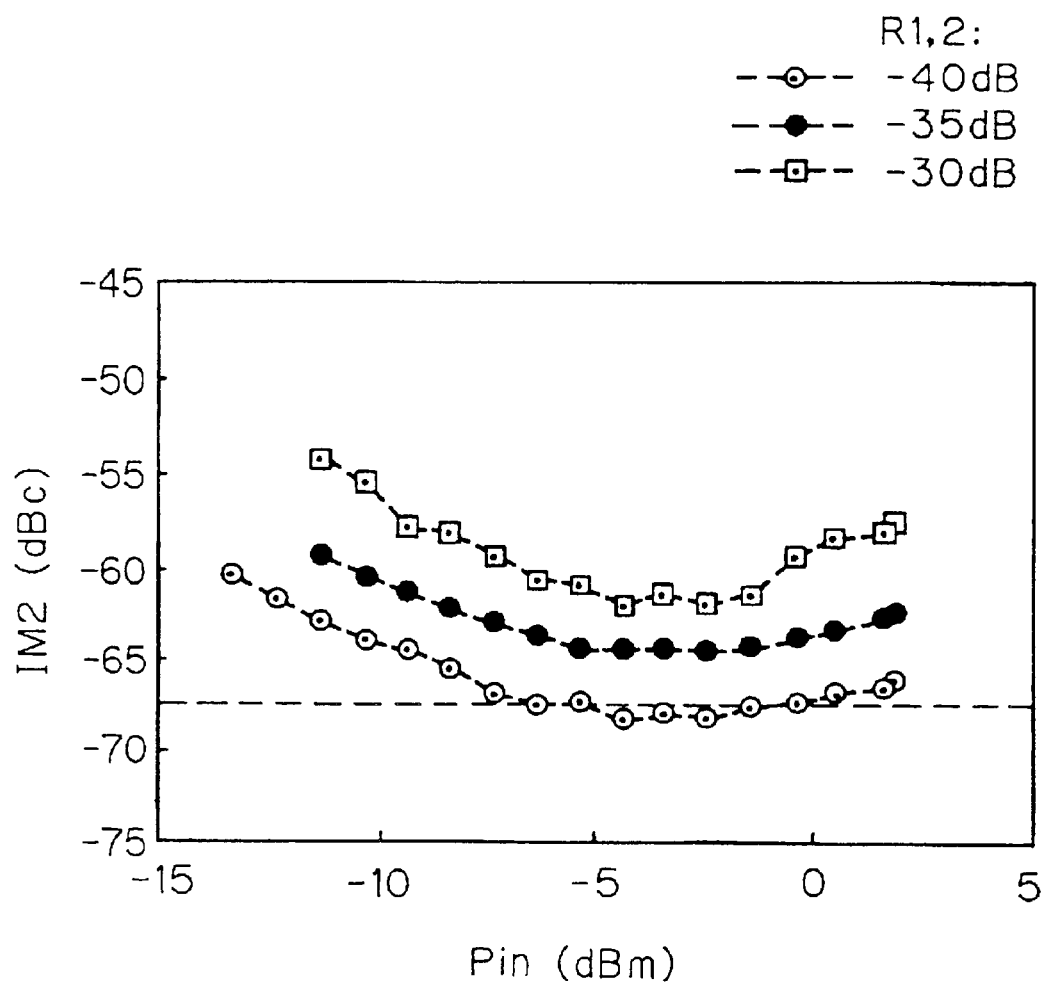
FIG. 11 is a graph showing the IM2 characteristic with respect to the amount of input light of the fiber amplifier of Example 2.

The optical isolator was disposed at a position where the gain of the EDF1 12 is equal to that of the EDF2 14 as in Example 1. The measurement results of the IM2 distortion with respect to the input light amount are shown in FIG. 11. The reflectance at the input and output ends was used as a variable. From FIG. 11, it is observed that the deterioration in the IM2 distortion can be sufficiently suppressed when the reflectance is −40 dB or less.

The inventors of the present invention have analytically studied the optimum length of the entire single-mode fiber for obtaining an IM2 distortion sufficiently smaller than the distortion of the laser.

Figure 12:
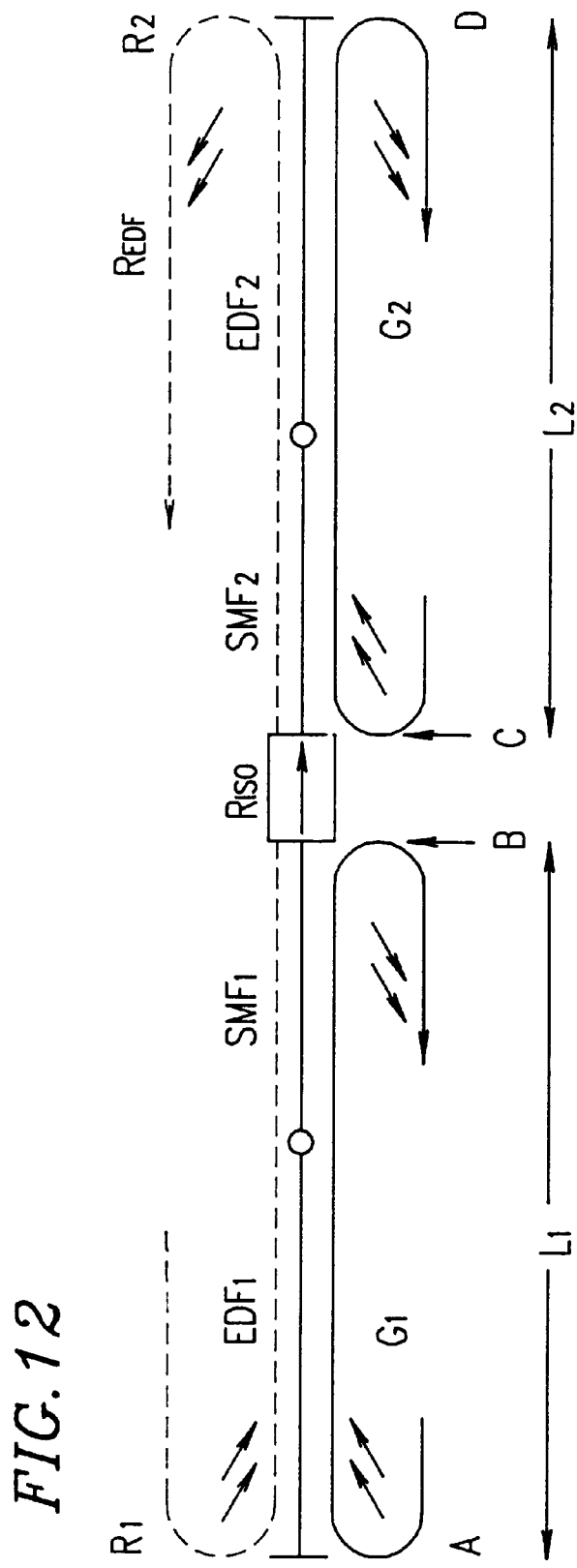
FIG. 12 shows an analytical model of the fiber amplifier of Example 2.

FIG. 12 shows an analytical model of the fiber amplifier according to the present invention, together with internal reflection points thereof. The reflection points are a signal incident point A, a signal emergent point D, and points B and C at the input and output ends of the intermediate optical isolator. Assume that the reflectance at the points A and D are $R_1$ and $R_2$ respectively, that the reflectance at the points B and C is $R_{ISO}$, and that the effective reflectance due to backward Rayleigh scattering generated in the erbium-doped fiber is $R_{EDF}$. Multiple reflection is generated between the points A and B, the points C and D, and the points A and D. When the distance between the points A and B is $L_1$ and the distance between the points C and D is $L_2$, the IM2 distortion at the modulation with a 2-tone signal is represented by expression (4) below:

$$IM2(f) = \left(\frac{2\xi}{m}\right)^2 R_1 R_2 \left[\cos\left\{\sum_{k=1}^{N} 2 \cdot \frac{\Delta f}{\Delta I} \cdot \frac{I_b - I_{th}}{f_k} \cdot m \cdot \right.\right. \tag{4}$$
$$\left.\left. \sin(\pi \cdot f_k \cdot \tau) \cdot \cos(2 \cdot \pi \cdot f_k \cdot t + \phi_k) + \theta\right\}\right] \cdot \exp(-2\pi \Delta v \tau)$$
$$\tau = \frac{2L}{v}$$

wherein $R_1$ denotes the reflectance at the input end of the EDF1, $R_2$ denotes the reflectance at the output end of the EDF2, $\xi$ is the coupling coefficient of the plane of polarization, m denotes the modulation depth per channel, $\Delta v$ denotes the line width of the signal light laser, v denotes the light velocity in the fiber, N denotes the number of channels, $f_k$ denotes the frequency of the k-th channel, $\phi_k$ denotes the phase of the k-th channel, θ denotes the phase of light, β denotes the chirp of the signal light source, $I_b$ denotes the bias current of the signal light source, the $I_{th}$ denotes the threshold current of the signal light source, ΔI denotes a change in a bias current $I_b$ per unit time, Δf denotes a change in a frequency of the signal light per unit time, Δf/ΔI denotes a "chirp" of the signal light source (i.e., Δf/ΔI=β), and t denotes time.

Figure 13:
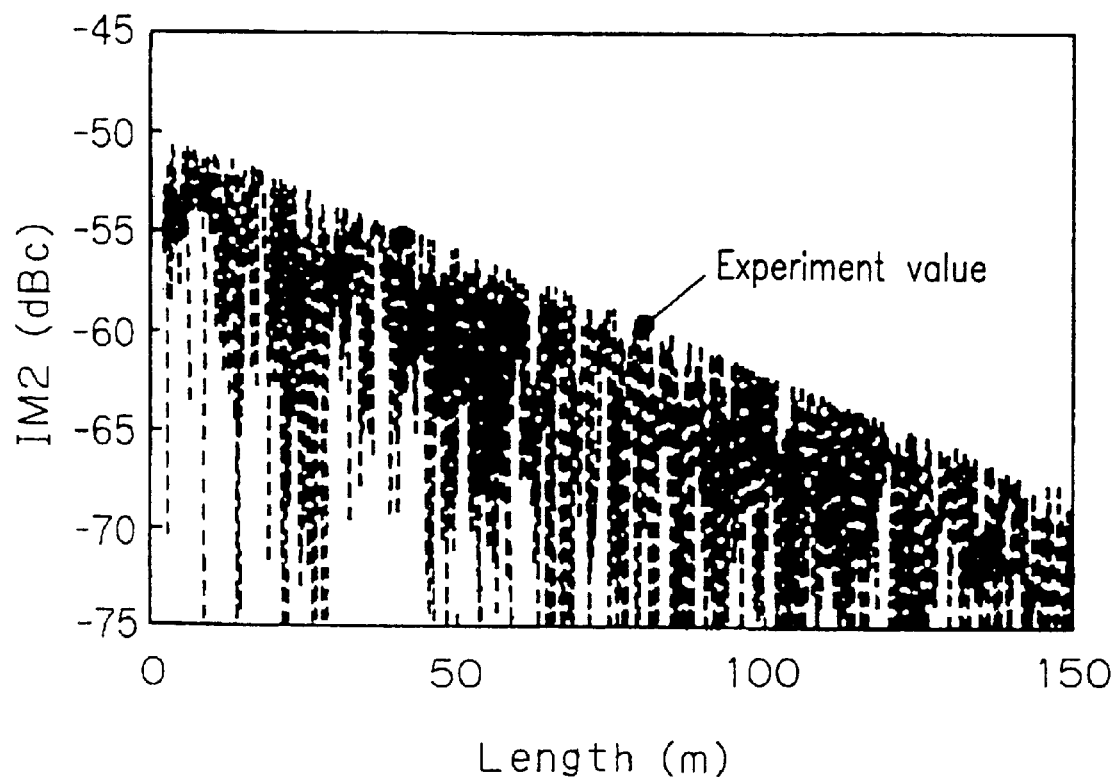
FIG. 13 is a graph showing the distortion characteristic with respect to the total fiber length of the fiber amplifier according to the present invention.
Figure 14:
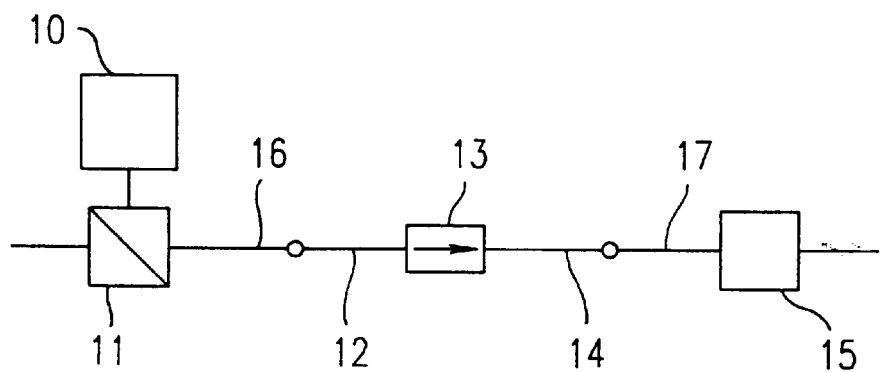
FIG. 14 shows a configuration of a modified fiber amplifier of Example 2 according to the present invention.

FIG. 13 shows the IM2 distortion of the fiber amplifier with respect to the total fiber length. The dashed lines represent values calculated from expression (4). From FIG. 13, it is observed that, in the case of a reflectance of −40 dB, the IM2 distortion can be equal to or less than the distortion of the laser used in the test (−67.5 dB) when the total length of the doped fiber and the single-mode fiber is 150 m or more. Thus, the deterioration in the distortion caused by the fiber amplifier can be minimized. From expression (4), it is found that this length of the fibers depends on the oscillation line width of the signal light laser. A longer single-mode fiber is required when a laser with a small line width is used. In this case, the required length of the fiber can be obtained from expression (4) as in the above case.

In this example, the single-mode fiber was connected to each of the erbium-doped fibers. If the length of the entire erbium-doped fiber is larger than the required length determined based on expression (4), the single-mode fiber may be connected to only one end of the optical isolator. In particular, if the length of the entire erbium-doped fiber is sufficiently larger than the required length determined based on expression (4), it is not necessary to insert the single-mode fiber.

In this example, the single-mode fibers were connected to both ends of the optical isolator. They may also be disposed between the EDF1 12 and the coupler 11, between the EDF2 14 and the filter 15, on the incident side of the coupler 11, and the emergent side of the filter 15. For example, the configuration shown in FIG. 14 may be used.

In the above examples, the erbium-doped fiber was used as the rare earth element doped fiber of the fiber amplifier. Alternatively, praseodymium (Pr) or neodymium (Nd) may be used in place of erbium. Signal light of 1.3 μm band can also be amplified by using a fiber doped with these elements.

(EXAMPLE 3)

The fiber amplifier of Example 3 according to the present invention will be described with reference to FIG. 15.

Figure 15:
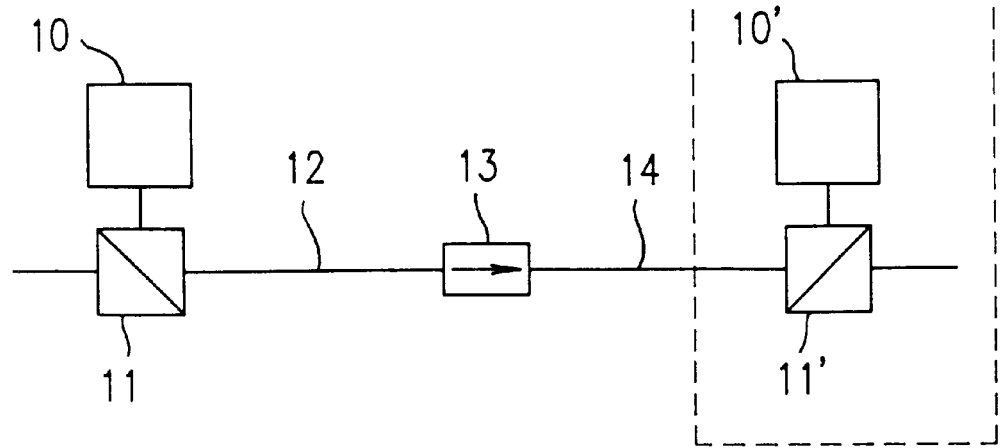
FIG. 15 shows a configuration of a fiber amplifier of Example 3 according to the present invention.

FIG. 15 shows a configuration of the fiber amplifier of this example. In FIG. 15, components corresponding to those of the fiber amplifier of Example 1 are denoted by the same reference numerals shown in FIG. 1.

The fiber amplifier of this example is different from that of Example 1 in that in this example pump light emitted from a 1.48 μm band semiconductor laser 10' is coupled to the EDF2 14 via a coupler 11'. The EDF2 14 is excited by bidirectional pump light from the two semiconductor lasers 10 and 10'. The resultant output from the fiber amplifier of this example is higher than that in Example 1. For example, in the case where the fiber is bidirectionally excited with pump light with a total power of 100 mW, when the input light amount of signal light with a wavelength of 1.56 μm is 0 dBn, the output optical amount of about 18.5 dBm is obtained.

(EXAMPLE 4)

Figure 16:
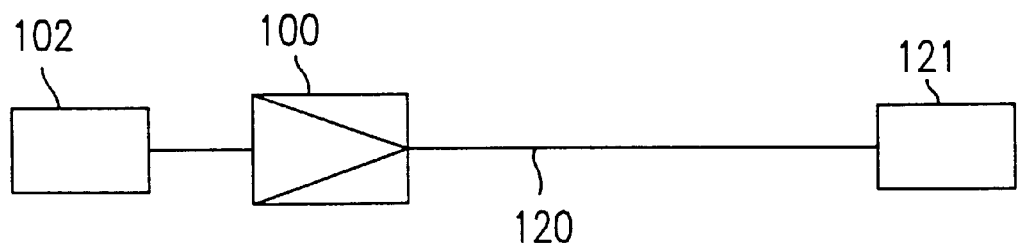
FIG. 16 shows a configuration of a fiber transmission system of Example 4 according to the present invention.

In this example, a fiber transmission system according to the present invention will be described with reference to FIG. 16. FIG. 16 schematically shows the configuration of the fiber transmission system of this example.

Referring to FIG. 16, signal light from a semiconductor laser (DFB-LD) 102 as a signal light source with a wavelength of 1.560 μm is input into the input end of a fiber amplifier 100. The output end of the fiber amplifier 100 is connected to one end of a single-mode fiber 120 as a transmission route with a length of 10 km. The other end of the single-mode fiber 120 is connected to a light receiver 121.

In the fiber transmission system with the above configuration, signal light emitted from the semiconductor laser 102 is amplified by the fiber amplifier 100 and then output to the transmission route 120. The transmission characteristics can be improved by using the fiber amplifier with low NF and high output of Example 1 as the fiber amplifier 100.

(EXAMPLE 5)

Figure 17:
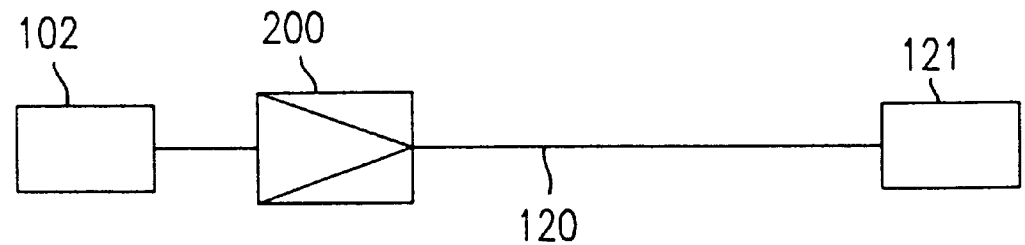
FIG. 17 shows a configuration of another fiber transmission system of Example 5 according to the present invention.

In this example, another fiber transmission system according to the present invention will be described with reference to FIG. 17. The fiber transmission system of this example is different from that of Example 4 shown in FIG. 16 in that in this example the fiber amplifier 200 of Example 2 is used as the fiber amplifier for this system.

In the fiber transmission system with the above configuration, signal light emitted from the semiconductor laser 102 as a signal light source is amplified by the fiber amplifier 200 and then output to the transmission route 120. The transmission characteristics can be improved by using the fiber amplifier with low NF, high output, and low distortion of Example 2 as the fiber amplifier 200.

Thus, according to the present invention, a fiber amplifier with low NF and high output can be provided by reducing light loss. A fiber amplifier with low distortion can also be provided.

Also, according to the present invention, a fiber transmission system which allows for long distance transmission and multiple distribution can be provided by using the low NF, high output fiber amplifier according to the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

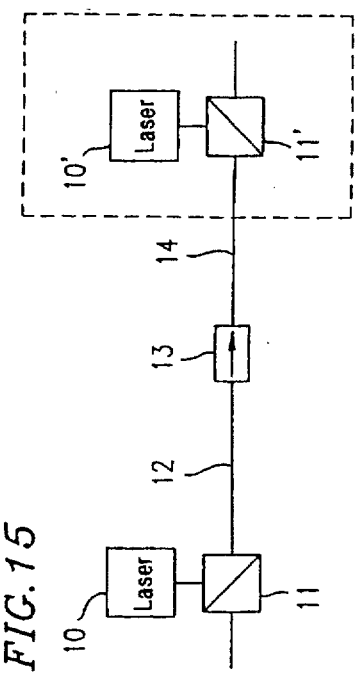
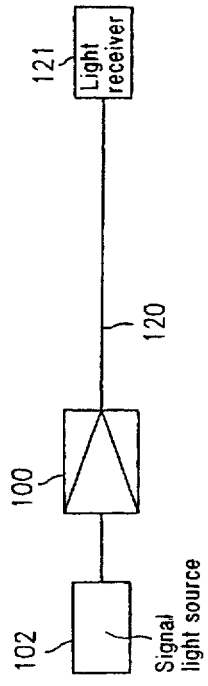
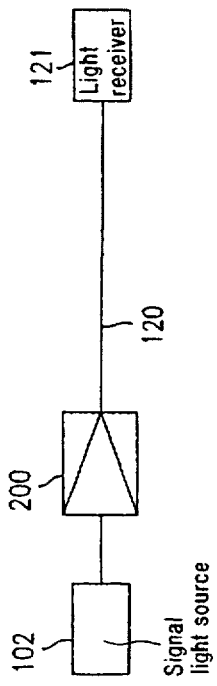

What is claimed is:

1. A fiber amplifier comprising: a first rare earth element doped fiber; a second rare earth element doped fiber; and a pump light source for generating pump light for exciting the first rare earth element doped fiber and the second rare earth element doped fiber, the fiber amplifier receiving signal light and amplifying the signal light, wherein the fiber amplifier further comprises a directional transmitter disposed between the first rare earth element doped fiber and the second rare earth element doped fiber, a transmittance of the directional transmitter for at least light having the same wavelength as the signal light propagating from the first rare earth element doped fiber to the second rare earth element doped fiber is larger than a transmittance of the directional transmitter for the light propagating from the second rare earth element doped fiber to the first rare earth element doped fiber, the pump light emitted from the pump light source is coupled to an input end of the first rare earth element doped fiber via a coupler, the fiber amplifier further comprises a second pump light source for generating second pump light, wherein the second pump light emitted from the second pump light source is coupled to an output end of the second rare earth element doped fiber via a second coupler, and a gain of the first rare earth element doped fiber for the signal light is substantially the same as a gain of the second rare earth element doped fiber for the signal light.

2. A fiber amplifier according to claim 1, wherein the directional transmitter is an optical isolator.

3. A fiber amplifier according to claim 2, wherein an isolation of the optical isolator is 20 dB or more for the signal light.

4. A fiber amplifier according to claim 1, wherein a ratio of a length of the first rare earth element doped fiber to a length of the second rare earth element doped fiber is adjusted so that the gain of the first rare earth element doped fiber for the signal light is substantially the same as the gain of the second rare earth element doped fiber for the signal light.

5. A fiber transmission system comprising: a signal light source for generating signal light; a fiber amplifier for amplifying the signal light; a fiber transmission route for transmitting the signal light; and a light receiver for receiving the signal light, wherein the fiber amplifier comprises a first rare earth element doped fiber, a second rare earth element doped fiber, and a pump light source for generating pump light for exciting the first rare earth element doped fiber and the second rare earth element doped fiber, the fiber amplifier receiving the signal light and amplifying the signal light, a gain of the first rare earth element doped fiber for the signal light is substantially the same as a gain of the second rare earth element doped fiber for the signal light, the fiber amplifier further comprises a directional transmitter disposed between the first rare earth element doped fiber and the second rare earth element doped fiber, a transmittance of the directional transmitter, for at least light having the same wavelength as the signal light propagating from the first rare earth element doped fiber to the second rare earth element doped fiber, is larger than a transmittance of the directional transmitter for the light propagating from the second rare earth element doped fiber to the first rare earth element doped fiber, a third rare earth element doped fiber; and a second directional transmitter disposed between the second rare earth element doped fiber and a the third rare earth element doped fiber, wherein a transmittance of the second directional transmitter for at least light having the same wavelength as the signal light propagating from the second rare earth element doped fiber to the third rare earth element doped fiber is larger than a transmittance of the second directional transmitter for the light propagating from the third rare earth element doped fiber to the second rare earth element doped fiber, and the gain of the second rare earth element doped fiber for the signal light is substantially the same as a gain of the third rare element doped fiber for the signal light.

6. A fiber amplifier comprising: a first rare earth element doped fiber; a second rare earth element doped fiber; and a pump light source for generating pump light for exciting the first rare earth element doped fiber and the second rare earth element doped fiber, the fiber amplifier receiving signal light and amplifying the signal light, wherein the fiber amplifier filter comprises a directional transmitter disposed between the first rare earth element doped fiber and the second rare earth element doped fiber, and a transmittance of the directional transmitter for at least light having the same wavelength as the signal light propagating from the first rare earth element doped fiber to the second rare earth element doped fiber is larger than a transmittance of the directional transmitter for the light propagating from the second rare earth element doped fiber to the first rare earth element doped fiber;

wherein a value obtained from expression (3) below is equal to or less than a value obtained from expression (2) below:

$$NF_{ASE} = \frac{P_{ASE}}{4hv\Delta v} \quad (2)$$

$$NF_{REF} = \frac{Pin}{4hv\pi} \cdot \{(4G_1^2(R_1 + R_{EDF})(R_{ISO} + R_{EDF}) + 4G_2^2(R_{ISO} + R_{EDF})(R_2 + R_{EDF}) + 4G_{12}(G_{12} \div L)(R_1 + R_{EDF})(R_2 + R_{EDF}))\} \cdot \frac{1}{\sqrt{\pi}\sigma_f} \cdot \exp\left(-\frac{f^2}{4\sigma_f^2}\right) \quad (3)$$

$$\sigma_f = \beta \cdot (I_b - I_{th}) \cdot \frac{N\sqrt{m}}{2}$$

wherein $G_1$ denotes a gain of the first rare earth element doped fiber for the signal light, $G_2$ denotes a gain of the second rare earth element doped fiber for the signal light, $G_{12}$ denotes a sum of $G_1$ and $G_2$, $R_1$ denotes a reflectance at an input end of the first rare earth element doped fiber, $R_2$ denotes a reflectance at an output end of the second rare earth element doped fiber, $R_{ISO}$ denotes a reflectance at both ends of the optical isolator, $R_{EDF}$ denotes an effective reflectance due to backward Rayleigh scattering generated in the first and second rare earth element doped fibers, $P_{in}$ denotes a signal light amount incident on the first rare earth element doped fiber, m denotes a modulation depth per channel, v denotes a light velocity through the fibers, N denotes the number of channels, f denotes a modulation frequency of a carrier, β denotes a chirp of a signal light source, $I_b$ denotes a bias current of the signal light source, $I_{th}$ denotes a threshold current of the signal light source, L denotes an isolation of the optical isolator, Δv denotes a noise equivalent bandwidth, $P_{ASE}$ denotes an ASE power per noise equivalent bandwidth, and h denotes Planck's constant.

7. A fiber amplifier comprising: a first rare earth element doped fiber; a second rare earth element doped fiber; and a pump light source for generating pump light for exciting the first rare earth element doped fiber and the second rare earth element doped fiber, the fiber amplifier receiving signal light and amplifying the signal light, wherein the fiber amplifier further comprises a directional transmitter disposed between the first rare earth element doped fiber and the second rare earth element doped fiber, and a transmittance of the directional transmitter for at least light having the same wavelength as the signal light propagating from the first rare earth element doped fiber to the second rare earth element doped fiber is larger than a transmittance of the directional transmitter for the light propagating from the second rare earth element doped fiber to the first rare earth element doped fiber;

wherein a value obtained from expression (4) below is equal to or less than a distortion amount at a signal light source:

$$IM2(f) = \left(\frac{2\xi}{m}\right)^2 R_1 R_2 \left[\cos\left\{\sum_{k=1}^{N} 2 \cdot \frac{\Delta f}{\Delta I} \cdot \frac{I_b - I_{th}}{f_k} \cdot m \cdot \sin(\pi \cdot f_k \cdot \tau) \cdot \cos(2 \cdot \pi \cdot f_k t + \varnothing_k) + \theta\right\}\right] \cdot \exp(-2\pi\Delta v\tau) \quad (4)$$

$$\tau = \frac{2L}{v}$$

wherein $R_1$ denotes a reflectance at an input end of the first rare earth element doped fiber, $R_2$ denotes a reflectance at an output end of the second rare earth element doped fiber, $I_b$ denotes a bias current of a signal light source, $\Delta I$ denotes a change in the bias current $I_b$ per unit time, $\Delta f$ denotes a change in a frequency of the signal light per unit time, $\Delta f/\Delta I$ denotes a "chirp" of the signal light source, ξ denotes a coupling coefficient of a plane of polarization, m denotes a modulation depth per channel, $\Delta \mu$ denotes a line width of a signal light source, v denotes a light velocity through the fibers, N denotes the number of channels, $f_k$ denotes a frequency of k-th channel, $\phi_k$ denotes a phase of the k-th channel, θ denotes a phase of light, $I_{th}$ denotes a threshold current of the signal light source, and t denotes time.

8. A fiber transmission system comprising: a signal light source for generating analog signal light; a fiber amplifier for amplifying the analog signal light; a fiber transmission route for transmitting the signal light; and a light receiver for receiving the signal light, wherein the fiber amplifier comprises a first rare earth element doped fiber, a second rare earth element doped fiber, and a pump light source for generating pump light for exciting the first rare earth element doped fiber and the second rare earth element doped fiber, the fiber amplifier receiving the analog signal light and amplifying the analog signal light, the fiber amplifier further comprises a bidirectional transmitter disposed between the first rare earth element doped fiber and the second rare earth element doped fiber, and a transmittance of the directional transmitter, for at least light having the same wavelength as the signal light propagating from the first rare earth element doped fiber to the second rare earth element doped fiber, is larger than a transmittance of the directional transmitter for the light propagating from the second rare earth element doped fiber to the first rare earth element doped fiber;

wherein a value obtained from expression (3) below is equal to or less than a value obtained from expression (2) below:

$$NF_{ASE} = \frac{P_{ASE}}{4hv\Delta v} \quad (2)$$

-continued $$NF_{REF} = \frac{P_{in}}{4hv\pi} \cdot \{(4G_1^2(R_1 + R_{EDF})(R_{ISO} + R_{EDF}) + \qquad (3)$$
$$4G_2^2(R_{ISO} + R_{EDF})(R_2 + R_{EDF}) +$$
$$4G_{12}(G_{12} \div L)(R_1 + R_{EDF})(R_2 + R_{EDF}))\} \cdot$$
$$\frac{1}{\sqrt{\pi}\,\sigma_f} \cdot \exp\left(-\frac{f^2}{4\sigma_f^2}\right)$$

$$\sigma_f = \beta \cdot (I_b - I_{th}) \cdot \frac{N\sqrt{m}}{2}$$

wherein $G_1$ denotes a gain of the first rare earth element doped fiber for the signal light, $G_2$ denotes a gain of the second rare earth element doped fiber for the signal light, $G_{12}$ denotes a sum of $G_1$ and $G_2$, $R_1$ denotes a reflectance at an input end of the first rare earth element doped fiber, $R_2$ denotes a reflectance at an output end of the second rare earth element doped fiber, $R_{ISO}$ denotes a reflectance at both ends of the optical isolator, $R_{EDF}$ denotes an effective reflectance due to backward Rayleigh scattering generated in the first and second rare earth element doped fibers, $P_{in}$ denotes a signal light amount incident on the first rare earth element doped fiber, m denotes a modulation depth per channel, v denotes a light velocity through the fibers, N denotes the number of channels, f denotes a modulation frequency of a carrier, β denotes a chirp of the signal light source, $I_b$ denotes a bias current of the signal light source, $I_{th}$ denotes a threshold current of the signal light source, L denotes an isolation of the optical isolator, Δv denotes a noise equivalent bandwidth, $P_{ASE}$ denotes an ASE power per noise equivalent bandwidth, and h denotes Planck's constant.

9. A fiber transmission system comprising: a signal light source for generating analog signal light; a fiber amplifier for amplifying the analog signal light; a fiber transmission route for transmitting the signal light; and a light receiver for receiving the signal light, wherein the fiber amplifier comprises a first rare earth element doped fiber, a second rare earth element doped fiber, and a pump light source for generating pump light for exciting the first rare earth element doped fiber and the second rare earth element doped fiber, the fiber amplifier receiving the analog signal light and amplifying the analog signal light, the fiber amplifier further comprises a bidirectional transmitter disposed between the first rare earth element doped fiber and the second rare earth element doped fiber, and a transmittance of the directional transmitter, for at least light having the same wavelength as the signal light propagating from the first rare earth element doped fiber to the second rare earth element doped fiber, is larger than a transmittance of the directional transmitter for the light propagating from the second rare earth element doped fiber to the first rare earth element doped fiber;

wherein a value obtained from expression (4) below is equal to or less than a distortion amount at the signal light source:

$$IM2(f) = \left(\frac{2\xi}{m}\right)^2 R_1 R_2 \left[\cos\left\{\sum_{k=1}^{N} 2 \cdot \frac{\Delta f}{\Delta I} \cdot \frac{I_b - I_{th}}{f_k} \cdot m \cdot \right.\right. \qquad (4)$$
$$\left.\left. \sin(\pi \cdot f_k \cdot \tau) \cdot \cos(2 \cdot \pi \cdot fkt + \varnothing_k) + \theta\right\}\right]^2 \cdot \exp(-2\pi\Delta v \tau)$$

$$\tau = \frac{2L}{v}$$

wherein $R_1$ denotes a reflectance at an input end of the first rare earth element doped fiber, $R_2$ denotes a reflectance at an output end of the second rare earth element doped fiber, $I_b$ denotes a bias current of a signal light source, ΔI denotes a change in the bias current $I_b$ per unit time, Δf denotes a change in a frequency of the signal light per unit time, Δf/ ΔI denotes a "chirp" of the signal light source, ξ denotes a coupling coefficient of a plane of polarization, m denotes a modulation depth per channel, Δv denotes a line width of the signal light source, v denotes a light velocity through the fibers, N denotes the number of channels, $f_k$ denotes a frequency of a k-th channel, $\phi_k$ denotes a phase of the k-th channel, θ denotes a phase of light, $I_{th}$ denotes a threshold current of the signal light source, and t denotes time.

10. A fiber amplifier comprising: a first rare earth element doped fiber; a second rare earth element doped fiber; and a pump light source for generating pump light for exciting the first rare earth element doped fiber and the second rare earth element doped fiber, the fiber amplifier receiving signal light and amplifying the signal light, wherein the fiber amplifier further comprises a directional transmitter disposed between the first rare earth element doped fiber and the second rare earth element doped fiber, a transmittance of the directional transmitter for at least light having the same wavelength as the signal light propagating from the first rare earth element doped fiber to the second rare earth element doped fiber is larger than a transmittance of the directional transmitter for the light propagating from the second rare earth element doped fiber to the first rare earth element doped fiber, a gain of the first rare earth element doped fiber for the signal light is substantially the same as a gain of the second rare earth element doped fiber for the signal light, and a third rare earth element doped fiber; and a second directional transmitter disposed between the second rare earth element doped fiber and the third rare earth element doped fiber, wherein a transmittance of the second directional transmitter for at least light having the same wavelength as the signal light propagating from the second rare earth element doped fiber to the third rare earth element doped fiber is larger than a transmittance of the second directional transmitter for the light propagating from the third rare earth element doped fiber to the second rare earth element doped fiber, and the gain of the second rare earth element doped fiber for the signal light is substantially the same as a gain of the third rare element doped fiber for the signal light.

* * * * *

UNITED STATES PATENT AND TRADE MARK OFFICE
CERTIFICATE OF CORRECTION

PATENT NO. : 5,914,808
DATED : June 22, 1999
INVENTOR(S) : Mitsuda et al.

It is certified that error appears in the above-identified patent and that said Letters Patent is hereby corrected as shown below:

At column 12, equation 4, after " } ] ", insert --$^2$--.

At column 12, line 24, delete "$\mu$" and insert --v--.

Drawing sheets 1, 7, 10 and 11, please remove Figures 1, 2, 9, 10, 14, 15, 16 and 17 and replace with Figures 1, 2, 9, 10, 14, 15, 16 and 17 as shown on the attached pages.

The Title page shing an illustrative figure should be deleted and substitu therefor the attached Title page.

Signed and Sealed this

Seventh Day of March, 2000

Q. TODD DICKINSON

*Attest:*

*Attesting Officer*       *Commissioner of Patents and Trademarks*

United States Patent [19]

Mitsuda et al.

[11] Patent Number: 5,914,808
[45] Date of Patent: Jun. 22, 1999

[54] INTERMEDIATE ISOLATOR TYPE FIBER AMPLIFIER AND FIBER TRANSMISSION SYSTEM

[75] Inventors: Masahiro Mitsuda, Kyoto; Jun Ohya, Osaka; Tomoaki Uno, Kobe, all of Japan

[73] Assignee: Matsushita Electric Industrial Co., Ltd., Osaka, Japan

[21] Appl. No.: 08/701,987

[22] Filed: Aug. 23, 1996

[30] Foreign Application Priority Data

Aug. 24, 1995 [JP] Japan ................................. 7-215831
Jul. 30, 1996 [JP] Japan ................................. 8-200670

[51] Int. Cl.$^6$ ....................................................... H01S 3/00
[52] U.S. Cl. ............................................ 359/341; 359/160
[58] Field of Search ................................. 359/341, 337, 359/160

[56] References Cited

U.S. PATENT DOCUMENTS

| | | | |
|---|---|---|---|
| 5,050,949 | 9/1991 | DiGiovanni et al. | 359/341 |
| 5,280,383 | 1/1994 | Federici et al. | 359/341 |
| 5,375,010 | 12/1994 | Zervas et al. | 359/341 |
| 5,430,572 | 7/1995 | DiGiovanni et al. | 359/341 |
| 5,497,265 | 3/1996 | Fontana et al. | 359/341 |
| 5,561,552 | 10/1996 | Shibuya | 359/341 |
| 5,566,018 | 10/1996 | Lee et al. | 359/341 |
| 5,579,153 | 11/1996 | Laming et al. | 359/341 |

OTHER PUBLICATIONS

W.-Y. Guo et al., "High–Speed Bidirectional Four–Channel Optical FDM–NCFSK Transmission Using an $Er^{3+}$–Doped Fiber Amplifier", *IEEE Photonics Technology Letters*, vol. 5, No. 2, pp. 232–235, 1993.

M. N. Zervas et al., "Efficient Erbium–Doped Fiber Amplifiers Incorporating an Optical Isolator", *IEEE Journal of Quantum Electronics*, vol. 31, No. 3, pp. 472–480, 1995.

O. Lumholt et al., "Optimum Position of Isolators within Erbium–Doped Fibers", *IEEE Photonics Technology Letters*, vol. 4, No. 6, pp. 568–570, 1992.

T. E. Darcie et al., "Fiber–Reflection–Induced Impairments in Lightwave AM–VSB CATV Systems", *Journal of Lightwave Technology*, vol. 9, No. 8, pp. 991–995, 1991.

*Primary Examiner*—Mark Hellner
*Attorney, Agent, or Firm*—Ratner & Prestia

[57] ABSTRACT

The fiber amplifier of this invention includes: a first rare earth element doped fiber; a second rare earth element doped fiber; and a pump light source for generating pump light for exciting the first rare earth element doped fiber and the second rare earth element doped fiber, the fiber amplifier receiving analog signal light and amplifying the analog signal light, wherein the fiber amplifier further includes a directional transmitter disposed between the first rare earth element doped fiber and the second rare earth element doped fiber, and a transmittance of the directional transmitter for at least light having the same wavelength as the signal light propagating from the first rare earth element doped fiber to the second rare earth element doped fiber is larger than a transmittance of the directional transmitter for the light propagating from the second rare earth element doped fiber to the first rare earth element doped fiber.

10 Claims, 11 Drawing Sheets

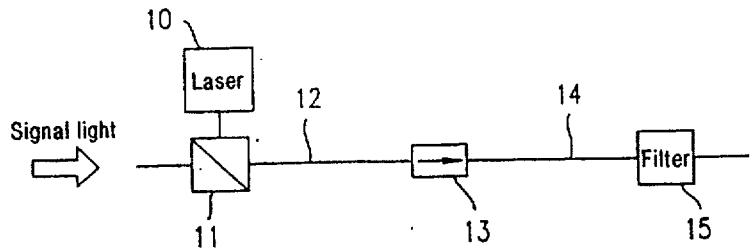

UNITED STATES PATENT AND TRADEMARK OFFICE
CERTIFICATE OF CORRECTION

PATENT NO. : 5,914,808
DATED : June 22, 1999
INVENTOR(S) : Mitsuda et al.

It is certified that error appears in the above-identified patent and that said Letters Patent is hereby corrected as shown below:

*FIG. 1*

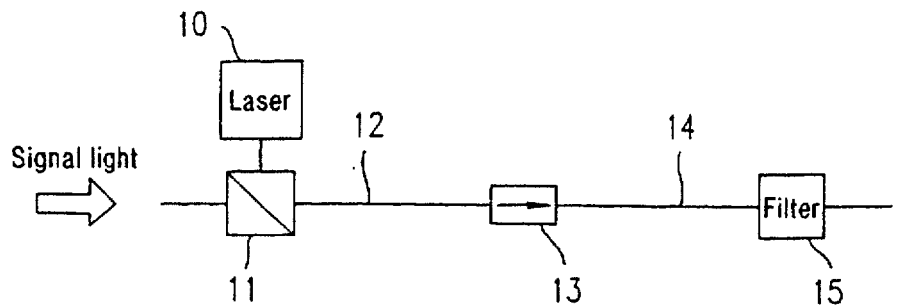

*FIG. 2*

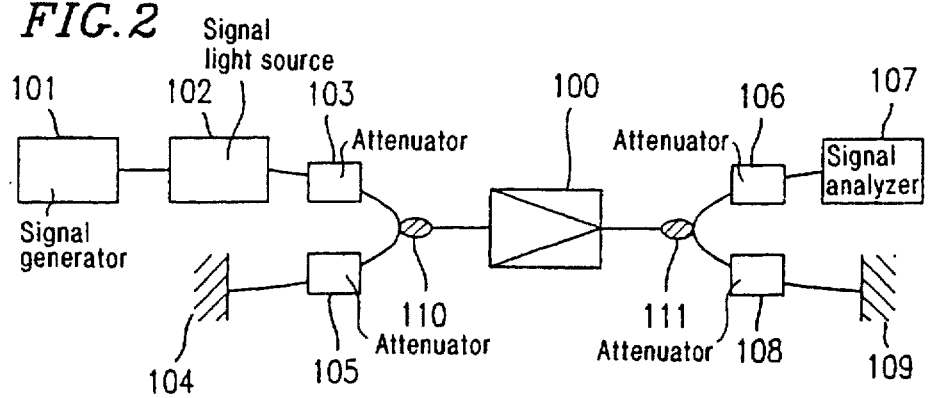

UNITED STATES PATENT AND TRADEMARK OFFICE
CERTIFICATE OF CORRECTION

PATENT NO. : 5,914,808
DATED : June 22, 1999
INVENTOR(S) : Mitsuda et al.

It is certified that error appears in the above-identified patent and that said Letters Patent is hereby corrected as shown below:

FIG. 9

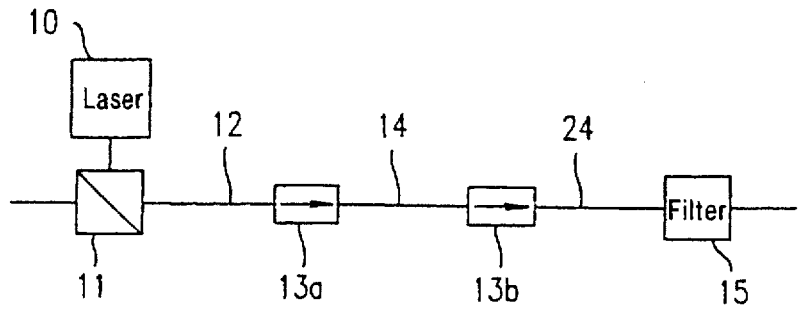

FIG. 10

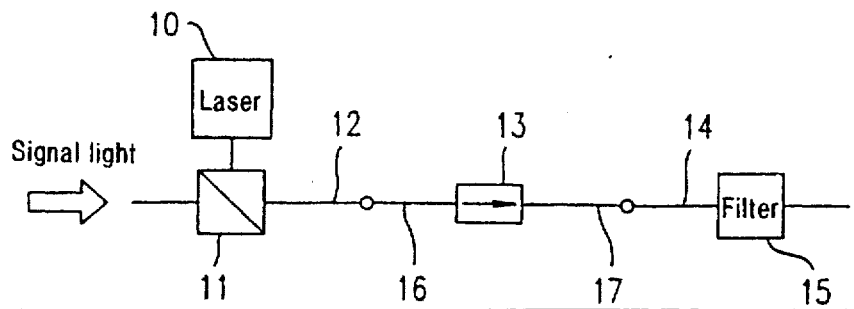

UNITED STATES PATENT AND TRADEMARK OFFICE
CERTIFICATE OF CORRECTION

PATENT NO. : 5,914,808

DATED : June 22, 1999

INVENTOR(S) : Mitsuda et al.

It is certified that error appears in the above-identified patent and that said Letters Patent is hereby corrected as shown below:

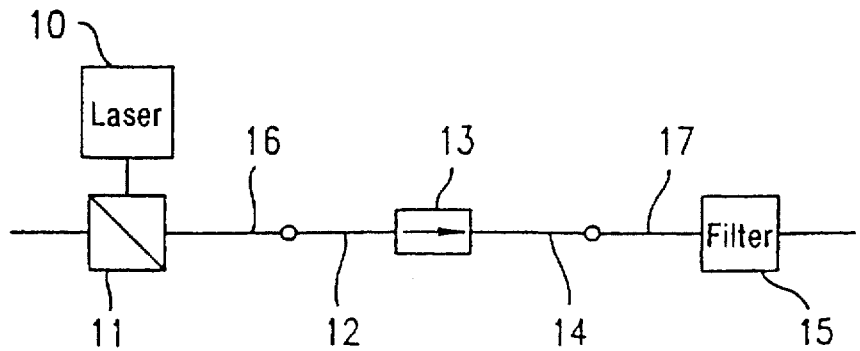

FIG. 14

UNITED STATES PATENT AND TRADEMARK OFFICE
CERTIFICATE OF CORRECTION

PATENT NO. : 5,914,808

DATED : June 22, 1999

INVENTOR(S) : Mitsuda et al.

It is certified that error appears in the above-identified patent and that said Letters Patent is hereby corrected as shown below: